United States Patent [19]
Vincent et al.

[11] Patent Number: 6,085,255
[45] Date of Patent: Jul. 4, 2000

[54] SYSTEM AND ASSOCIATED METHOD FOR RE-ENGINEERING A TELECOMMUNICATIONS SUPPORT SYSTEM WITH OBJECT-ORIENTED TRANSLATORS

[75] Inventors: Alan W. Vincent, Louisville; Carlton S. Hall, Broomfield, both of Colo.

[73] Assignees: US West, Inc., Denver; MediaOne Group, Inc., Englewood, both of Colo.

[21] Appl. No.: 09/002,075

[22] Filed: Jan. 23, 1998

Related U.S. Application Data

[62] Division of application No. 08/491,002, Jun. 14, 1995, Pat. No. 5,903,731.

[51] Int. Cl.[7] .............................. G06F 13/38; G06F 15/17
[52] U.S. Cl. .......................... 709/238; 709/239; 709/226
[58] Field of Search .................................... 709/226, 229, 709/242, 223, 239, 243, 244, 238; 370/397, 409; 379/121, 126

[56] References Cited

U.S. PATENT DOCUMENTS

| 5,307,484 | 4/1994 | Baker et al. .............................. 395/600 |
| 5,333,183 | 7/1994 | Herbert .................................... 379/112 |
| 5,473,599 | 12/1995 | Li et al. ..................................... 370/16 |
| 5,499,343 | 3/1996 | Pettus .................................... 395/200.2 |
| 5,615,372 | 3/1997 | Nishina .................................... 395/653 |
| 5,903,731 | 5/1999 | Vincent et al. .......................... 709/226 |

OTHER PUBLICATIONS

Sturman, D.C.; "Modular Specification of Interaction Policies in Distributed Computing"; Doctoral Thesis; Univeristy of Illinois; 1996.

Primary Examiner—Mark H. Rinehart
Attorney, Agent, or Firm—Holme, Roberts & Owen

[57] ABSTRACT

A re-engineering method for standardizing data processing in a communication network while maintaining user services is disclosed. Data channels, between communicating network data processing components (hereinafter denoted operational components), are made unnecessary by systematically providing bypass data paths. The data on each bypass, transparent to its terminating operational components, is routed through a network manager communicating in a standardized protocol. The manager thereby provides centralized control of data communications and provides standardized object oriented data representations and protocols. For a selected operational component having a bypass for each data channel, the functionality of the selected operational component may be incrementally and transparently assumed by new operational components communicating with the manager. Thus, a selected operational component using nonstandard data representations and communication protocols can be isolated from other network components and deactivated while maintaining user services. The present invention is particularly useful in re-engineering telephony networks having noncentralized and nonstandardized communications between various combinations of network elements and operational support systems.

10 Claims, 11 Drawing Sheets

SYSTEM AND ASSOCIATED METHOD FOR RE-ENGINEERING A TELECOMMUNICATIONS SUPPORT SYSTEM WITH OBJECT-ORIENTED TRANSLATORS

RELATED APPLICATIONS

This application is a divisional of U.S. patent application Ser. No. 08/491,002, filed Jun. 14, 1995, and titled "SYSTEM AND ASSOCIATED METHOD FOR RE-ENGINEERING A TELECOMMUNICATIONS SUPPORT SYSTEM WITH OBJECT-ORIENTED TRANSLATORS" now U.S. Pat. No. 5,903,731.

FIELD OF THE INVENTION

The present invention relates to incrementally restructuring the architecture of a communications network and, in particular, standardizing network management data processing in a telecommunications network.

BACKGROUND OF THE INVENTION

Communication networks typically include a plurality of distinct network communication providing components, and network management components. The network communication providing components, commonly called network elements, provide information transmission services for network users, whereas the network management components manage the traffic flow, resources and accounting relating to use of the network and in particular the network elements. Examples of such networks include: LANS, WANS, and telephony networks. In many communication networks there are network management components known as operational support systems (OSSs), wherein each such OSS may be a relatively complex hardware/software configuration for performing one or more network management functions such as: network monitoring, correcting network performance problems, allocating network resources and billing for network services. At least in telephony networks, many such operational support systems were developed (a) prior to (and therefore without the assistance of) recent network engineering techniques, architectures and standards, and (b) incrementally adapted in substantially a piecemeal fashion with few design considerations related to the automation and management of the network as a whole. In fact, OSSs satisfying (a) and (b) are so numerous and their maintenance difficulties are so well known that the common term of art, "legacy systems," has been coined to denote them. In particular, the legacy systems have been an impediment to the introduction of network elements and/or operational supports systems having hardware/software architectures that could provide more robust and cost effective network operation. For instance, since the legacy systems have few common architectural features, the utilization of advances in: network management systems, network system engineering, and enhanced network element features progressively becomes a more complex and difficult task, particularly, as these advances provide new capabilities utilized most effectively with architectures increasingly at odds with the legacy systems. Further, since the legacy systems communicate with network elements using a plurality of nonstandard and/or licensed communication protocols, the combination of stopgap maintenance adaptations together with these nonstandard communication protocols have resulted in a complex web of communication channels between operational support systems, and between network elements and operational support systems. In particular, many-to-many relationships exist wherein many network elements and/or OSSs directly supply information to a plurality of other OSSs and, conversely, many network elements and OSSs directly receive information from a plurality of network elements and/or OSSs. Accordingly, this complexity in the network management information flow tends to make the network management ill-conditioned; that is, seemingly small changes to network operational components may have substantial unintended consequences. Moreover, this complexity also reduces the effectiveness of the network in being able to adapt to new market pressures, new technologies and changing management directives.

Note that the above drawbacks of the legacy systems have become progressively worse with the new network architectures and standards which have been developed since 1985. In particular, the following network standardization and architectural specifications provide a direction for future communication networks in which the legacy systems and their associated network elements cannot easily partake:

(1.1) International Telecommunication Union-Telecommunication (ITU-T) Telecommunications Management Network (TMN) Recommendation M.3000 Series;

(1.2) International Telecommunication Union-Telecommunication (ITU-T) Recommendation X.700 Series;

(1.3) OMNIPoint 1 and 2 specifications from the Network Management Forum August 1992;

(1.4) International Standardization Profiles (ISPs) from the International Standards Organization (ISO) from the following: Series and Specifications ISO9595-X, ISO9596-X, ISO10165-X, ISO10733 and ISO10164-X; and (1.5) International Electro Technical Commission specifications (IEC) (i.e., ISO standard, ISO/IEC7498, also known as Recommendation X.200) from ISO/IEC Copyright Office, Case Postale 56, SH-1211, Geneve, Switzerland.

As an aside, note that the above publications and all ISO standards and ISO/IEC Joint Standards (including those published also as ITU-T Recommendations are available from the American National Standards Institute, 11 West 42nd Street, New York, N.Y. 10036.

Additionally, and in conjunction with the above-mentioned publications, there are software architectures that have been recently developed which are also problematic for the legacy systems. In particular, the following software architectures are problematic for the legacy systems:

(2.1) distributed object oriented software architectures;

(2.2) manager-agent architectures;

(2.3) client-server architectures; and (2.4) distributed computing environments.

Moreover, heretofore there has been no known method for cost effectively implementing such new technologies in a uniform and consistent manner wherein there is a gradual migration to these new technologies within the framework of a master architectural plan for an entire network. Thus, in particular, since vendors supplying network elements have adopted many of these new standards and architectures, network providers have been left with essentially three options regarding advanced network elements:

(3.1) do not use the technological enhancements of the newer network elements and instead provide and/or maintain communication channels with the legacy systems through the current entanglement of such channels;

(3.2) develop new operational support systems for the newer network elements and use both the new operational support systems and the legacy systems independently and concurrently until all old network elements can be cost effectively retired; or (3.3) provide a new network management architecture for certain network elements and/or operational support systems independent of the legacy systems and "flash cut" (i.e., abruptly replace) a substantial portion of the legacy system with the new network architecture.

Since none of the above options has proven to be viable for large network service providers, it would be advantageous for network providers to have a straightforward method and/or system for migrating to new network technologies cost effectively. In particular, it would be advantageous to systematically transform a telephony or telecommunications network having legacy systems as described above into the more automated, efficient and standardized networks specified in the above-mentioned specifications (1.1)–(1.5) without prematurely and wholesalely retiring substantial portions of the network.

SUMMARY OF THE INVENTION

The present invention is a method for incrementally and systematically re-engineering a communications network wherein the present invention is intended to maintain network functionality throughout the re-engineering effort. In particular, the present invention may be used for replacing certain network management communication channels and management operational support systems in, for example, a telecommunications or telephony network. Thus, the present invention provides for the systematic and incremental introduction of newer network management systems and network technologies without: (a) prematurely retiring current network elements, and/or (b) abruptly replacing a substantial portion of the present network management as in flash cutting.

That is, by defining the term "operational component" as a network information processing unit having a functionality provided by a network element or an operational support system (OSS) within the network, the present invention provides a straightforward method for isolating and replacing a network operational component by repeatedly and systematically bypassing, deactivating and/or disconnecting communication channels connected to the operational component wherein each such communication channel or, equivalently, "data channel" is used for transferring data and/or network management commands. In particular, each communication channel utilizing a protocol that is, for example, nonstandard and specific to a particular (type of) operational component is a primary target for the introduction of an alternative bypass channel that provides: (a) substantially the same communications between the operational components as the target channel, and (b) translates the communications into a standardized communications protocol so that these communications can also be supplied to a network information manager. Thus, since an important aspect of the present invention is the translating between protocols, it is important to clarify the meaning of protocol. The term "protocol" is herein defined to mean:

(4.1) the control signals used for initializing, maintaining and terminating a communication;

(4.2) the form and timing of the control signals for the communication;

(4.3) the representation (e.g., data structures) of the information communicated;

(4.4) the form and timing of the information communicated (e.g., the size of information packets, the timing of such packets and the frequency of communication);

(4.5) in some cases, the timing for obtaining (sampling) data to be communicated; and (4.6) a set of rules and formats (semantic and syntactic) that determine the communication behavior of the components communicating using the protocol.

Further, the term "function oriented protocol" will herein be used to denote the protocols that are nonstandard and specific to the functionality of a particular OSS or a particular vendor network element. That is, for a function oriented protocol, its characteristics according to (4.1) through (4.5) are a combination that can not be cost effectively utilized with different operational components that perform substantially the same functions in the network.

Thus, for a each target or selected data channel to be deactivated between a first operational component (e.g., network element) and a second operational component (e.g., an operational support system) to be isolated, the present invention includes the following steps:

(5.1) providing a bypass data path as an alternate channel wherein:

(5.1.1) the first and second operational components may transfer data on the bypass data path substantially identically to how data is transferred on the target data channel; in particular, the same protocol may be used by the first and second operational components for transferring data on the bypass data path as is used on the target data channel such that it is substantially transparent to both operational components that the bypass data path is being used instead of the target data channel;

(5.1.2) data on the bypass data path is used by (at least one of) the first and second operational components instead of data on the target data channel;

(5.1.3) the bypass data path provides data communicated on it to a network data model for storing and use in modeling the network;

(5.2) deactivating the target data channel and using the bypass data path exclusively;

(5.3) repeating the steps (5.1) and (5.2) with each data channel connected to the second operational component that is not a bypass data path;

(5.4) supplying one or more third network operational components that originally received data from the second operational component with data from the data model derived from data on the bypass data path(s) so that the third operational components are able to continue to perform any desirable network services;

(5.5) providing a fourth (more advanced) OSS to take over any desirable network management services still provided by the second operational component, wherein the fourth OSS communicates with other operational components via the network data model; and (5.6) deactivating the second operational component.

Thus, the (any) required data previously transferred from the second operational component to one of the instances of the first operational component is now supplied to the first operational component by the data model or, more precisely, a data model manager. Conversely, any data previously received by the second operational component on a target or selected data channel for network functionality that must be retained is now received by the fourth operational component(s) via the network data model manager.

It is a further aspect of the present invention to incrementally change the architecture of a network management system such that the architecture is substantially consistent with a client-server paradigm wherein this paradigm requires data output by an operational component (e.g., a network element or an OSS) to be supplied to a data manager (i.e., the "server") for capturing (e.g., persistently storing) and for controlling access to the data. Thus, any operational component desiring this data must request the data from the data manager in order to receive the data. More precisely, the paradigm provides that such a data manager may coalesce, filter and/or reformulate data supplied to it as when gathering data for a client. Thus, the previous "direct" receivers of data from a supplying operational component now become clients for the data from the data manager. Therefore, in particular, in steps (5.1) above it is preferred that the bypass data path also transmit data to such a server data (model) manager prior to the data being supplied to the one or more third network operational components (i.e., clients) described in step (5.4) above.

It is important to note that such a server data manager may provide significant advantages over the direct operational component to operational component communication paradigm of many present network management systems. The client-server architecture provides the capabilities to present a single uniform view of data to clients that is not easily enforced in the operational component to operational component paradigm. For example, if two different data pathways supply similar data having essentially the same semantics but differing values, then the server may manipulate the data from one or both of the pathways so that a consistent single view of the data may be provided to each client. Thus, for example, on those occasions where network processing must be investigated as it relates to processing in two distinct operational components that are provided with exactly the same data (as in the client-server paradigm), the investigation is substantially simplified. In particular, this uniformity of data expedites locating and analyzing certain network malfunctions or faults.

It is a further aspect of the present invention to provide a method for incrementally changing the structure and understandability of network management communications by changing these communications so that they conform to standardized, well known protocols and data structures. Said another way, an "open systems" methodology is incrementally incorporated into the network management architecture by the present invention whereby operational components not supporting open systems communications protocols may also be systematically integrated into an open systems architecture. Thus, as a corollary to this aspect of the invention, the present invention provides a method for using both the enhanced capabilities of the newer more technically advanced operational components (in particular, network elements) having open systems interfaces and also using older network elements having nonstandard interfaces.

It is a further aspect of the present invention to incrementally change a network management system into an object oriented system. In particular, a network management system is incrementally transformed by the present invention from a system of data channels transferring data in formats that are both substantially specific to each data channel and that are not standardized, into a system having data channels that transfer data as objects and object messages derived from a standardized object class hierarchy developed for the network as a whole.

It is a further aspect of the present invention to incrementally change the network management system into a system that is substantially insulated from vendor specific communication interfaces and functionality. In particular, the present invention provides translators for restricting the infiltration of vendor specific communication interfaces and data protocols beyond the vendor supplied operational components. The translators therefore, translate between: (a) the vendor specific or nonstandard communication protocols and command sets, and (b) the standardized protocols and data architectures used by the remainder of the network management system.

It is also within the scope of the present invention to be utilized in other contexts than with operational components as defined above. In particular, the present invention is applicable if the term "operational component" were generalized to include substantially any network communication suppliers and receivers, such as for example network data bases, as one skilled in the art will recognize.

Other features and benefits of the present invention will become apparent from the detailed description contained hereinafter and from the accompanying figures.

DETAILED DESCRIPTION

Figure 1:
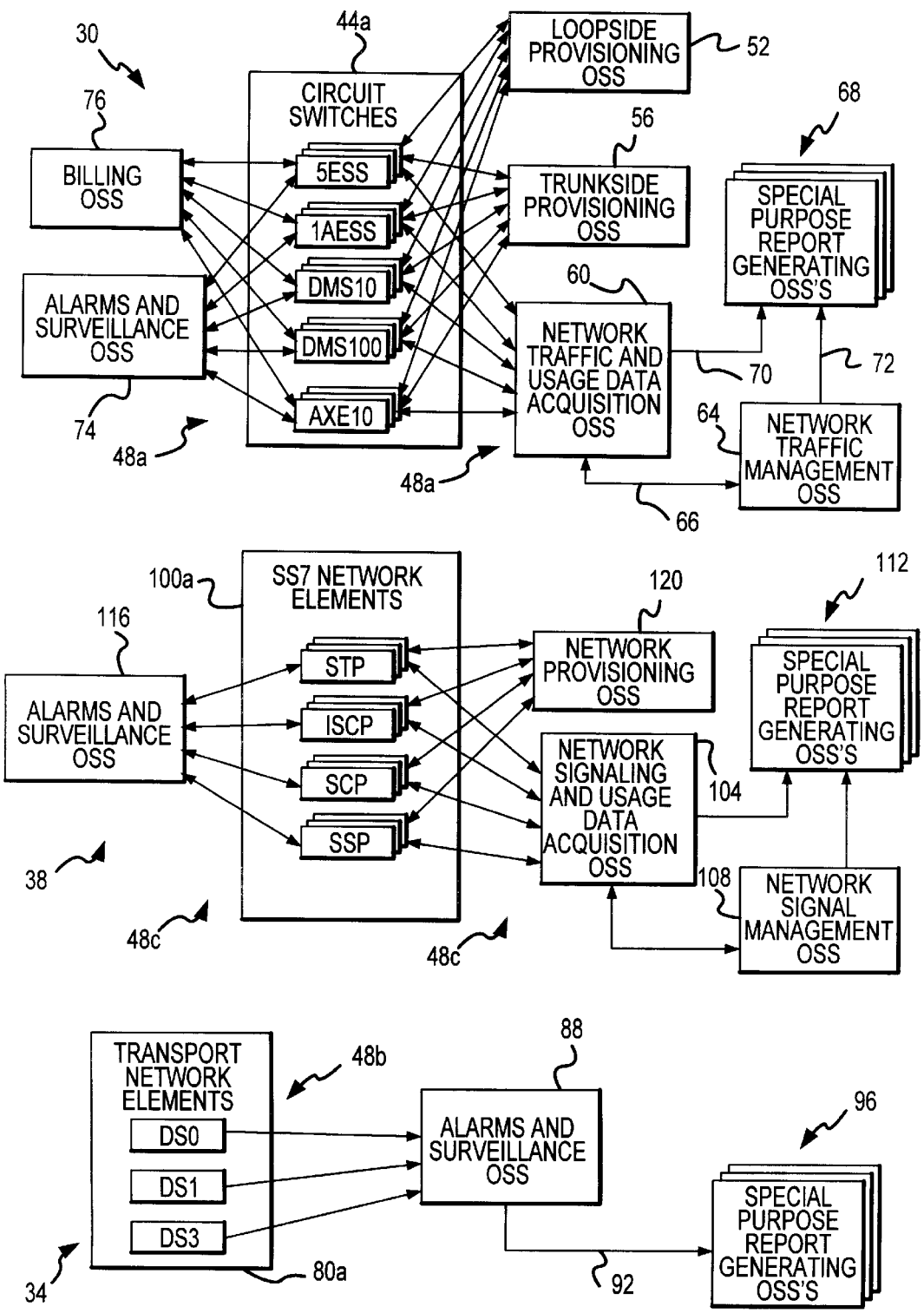
FIG. 1 is a high level diagram of a representative sample of a telephony network architecture presently used.

FIG. 1 provides a simplified illustration of some of the typical current telephony network elements together with some of the operational support systems (OSS) currently used in managing a telephony network. Such a network typically includes at least three network management areas 30, 34 and 38. Further, each area includes certain network elements which are in direct communication with specific OSSs via data channels 48 (a, b or c), each data channel being represented by the single and double headed arrows with each arrow head indicating a direction of data and/or command flow through the data channel represented by the arrow's shaft.

The network management area 30 manages processes and operations related to the completing and terminating of network customer calls. In particular, the network management area 30 includes the circuit switches 44a and other associated network elements (not shown) for routing and re-routing customer calls, plus, the operational support systems which communicate with the circuit switches 44a via the plurality of data channels 48a.

The circuit switches 44a shown in network management area 30 (i.e., "5ESS" and "1AESS" produced by "AT&T", "DMS10" and "DMS100" produced by Northern Telecom, and "AXE10" produced by Ericsson) are representative of the circuit switches which communicate with OSSs using protocols that are both nonstandard (e.g., specific to a particular vendor), and in addition, function oriented (e.g., the protocols transfer data and/or commands using data structures and data transfer timing that are substantially unique to the functionality of the data supplier and receiver). Thus, there may be a distinct protocol for substantially every data channel 48a, wherein for example, such data channels may communicate a different data type or data at a different sampling rate. Thus, even for two data channels supplying the "same data", if the timing of the samplings for the data and/or the timing of the data communication is different, then it may be very difficult to correlate the data from the two data channels as may be desirable when diagnosing network malfunctions.

The OSSs of network management area 30 will now briefly be discussed. The loop side provisioning OSS 52 monitors and (re)allocates local loop circuit switch 44a resources. The trunk side provisioning OSS 56 monitors and (re)allocates trunk side circuit switch resources. The network traffic and usage data acquisition OSS 60 collects circuit switch traffic and usage load data and provides commands to the circuit switches 44a for reconfiguring the circuit switches in order to, for example, balance the network traffic loads between various circuit switches. In accomplishing these functions, OSS 60 serves as a data filter and communication conduit for the "downstream" network traffic management OSS 64 via data channel 66, this latter OSS being the source of the circuit switch reconfigure commands supplied to the circuit switches 44a. Thus, for example, the OSS 64 may modify network conditions by sending commands to the network elements 44a to reroute certain user communication requests (e.g., telephone calls) through alternate switches due to capacity limitations (known in the art as "expansive control"), or commands may be sent to a network element 44a restricting the number of user communication requests that are allowed to access a particular network service (known in the art as "restrictive control").

Additionally, both the OSS 60 and the OSS 64 supply report data to a plurality of downstream special purpose report generating OSSs 68 via a plurality of data channels 70 and a plurality of data channels 72, respectively. The OSSs 68 generate reports which are, for example, supplied to various state and federal governmental agencies. Circuit switches 44a also communicate with an alarms and surveillance OSS 74 for determining network malfunctions and misuse (e.g., fraud). Further, each of the circuit switches 44a provide customer usage information to a billing OSS 76 so that customer usage bills may be determined.

The network management area 34 manages the processes and operations relating to the transport network elements 80. Such transport network elements include trunks and lines having various transmission bandwidth characteristics. As examples of such transport network elements, three of the more common "digital service" transport network element types are shown; i.e., DS0, DS1 and DS3.

The transport network elements 80a provide data via data channels 48b to a plurality of OSSs, many of which are analogous to the OSSs of the network management area 30. Representative of the OSSs for the network management area 34 is an alarms and surveillance OSS 88 that performs substantially the same functions for the transport network elements 80a as OSS 74 does for the circuit switches 44a. However, in addition, the OSS 88 also is the data filter and data conduit, via data channel 92, for supplying transport network related data to a plurality of special purpose report generating OSSs 96 which are similar in purpose to the OSSs 68.

The network management area 38 manages processes and operations related to the SS7 network which, as one skilled in the art will recognize, is a telephony network for communicating internal network control signals for requesting and coordinating the allocation and (de)activation of network resources for network user services. For example, the SS7 network is used to configure circuit switches between a caller and a callee, and properly allocate transport network elements 80 between the circuit switches so that a complete end-to-end electronic connection is provided between the caller and the callee.

The SS7 network includes network elements 100a of a number of different types. Examples of such network elements are: signal transfer points (STP), intelligent service control points (ISCP), service control points (SCP) and service switching points (SSP). Communicating, via the data channels 48c, with the network elements 100a directly are OSSs which are substantially analogous to the OSSs of the network management area 30. In particular, OSS 104 is analogous to OSS 60, OSS 116 is analogous to OSS 74. Further, the OSS 108 is analogous to OSS 64 and OSSs 112 are analogous to OSSs 68. Also, the network provisioning OSS 120 is analogous to the combination of OSSs 52 and 56. Thus, for example, OSS 108 provides commands to the SS7 network elements 100a, via OSS 104, for reconfiguring these network elements according to network traffic.

Figure 2:
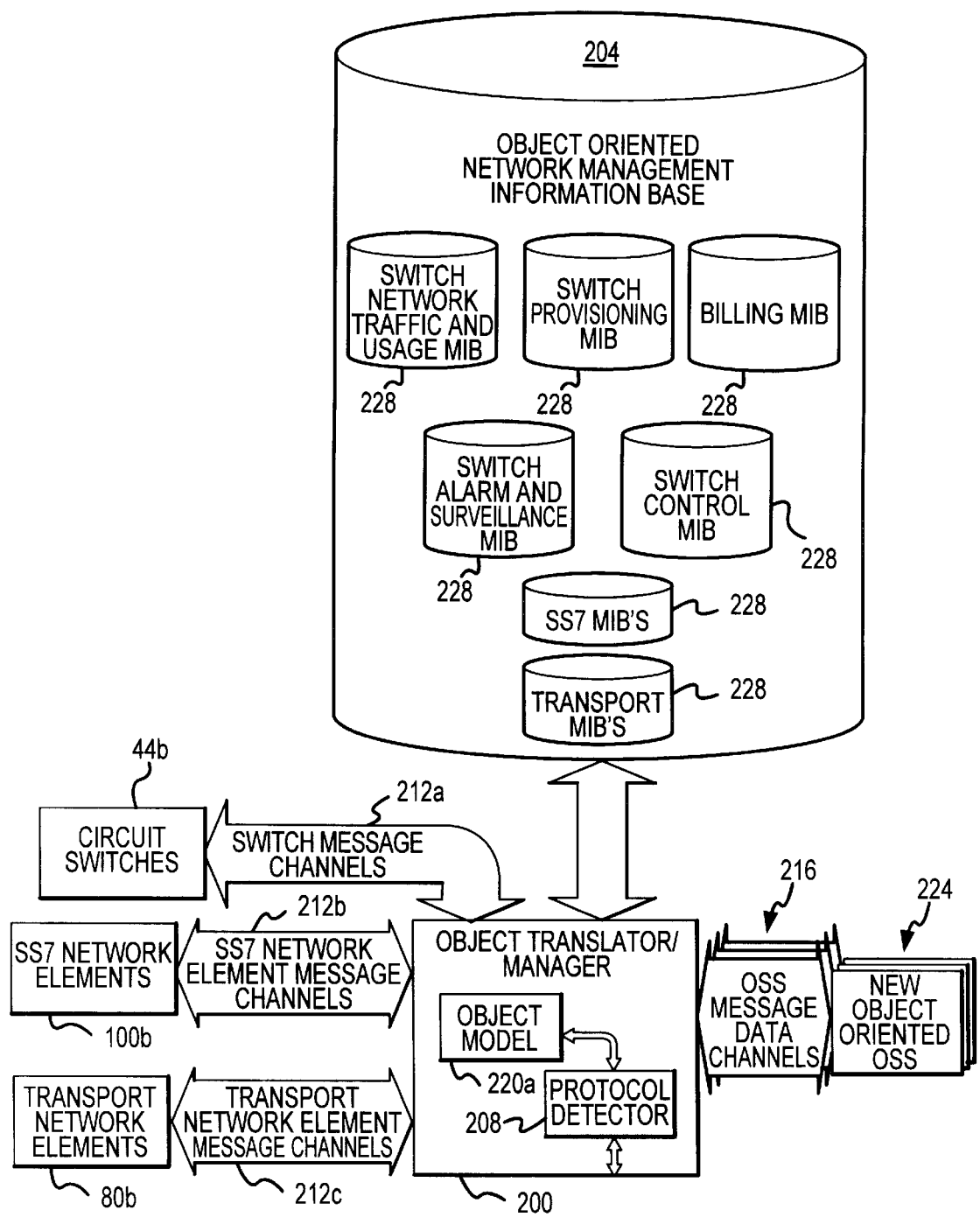
FIG. 2 is a high level diagram of a desired telephony network architecture.

FIG. 2 shows a high level block diagram of a network management architecture, into which it is desired to convert the network of FIG. 1. The network architecture of FIG. 2 differs from FIG. 1 in the following ways.

(6.1) The network architecture of FIG. 2 is based on a client-server paradigm, wherein instead of data channels communicating directly between operational components, the architecture of FIG. 2 requires all data communicated between operational components to be routed through a "server" which may store the data in a persistent data repository but, in any event, distributes the data to "clients", i.e., operational components requesting the data. In the present figure the server includes: (a) the object translator/manager 200, and (b) the object oriented network management information base 204, hereinafter also denoted MIB 204, which is a persistent data and/or object repository.

(6.2) The architecture of FIG. 2 is also based on standardized definitions of network data and/or objects (i.e., data records provided with specific behaviors) and data communication formats and protocols. In particular, these definitions include standardized object definitions related to network elements, network element management and services that use network elements. Thus, the standardized definitions define an object oriented model of the network and network processes. In the present embodiment of FIG. 2 the standards used are derived from the following sources:

(6.2.1) "The General Definition of Managed Objects" (GDMO) described in the published standard, ISO/IEC 10165-4 ITU-T Recommendation X.722 for defining network object classes, object attributes, operations and behaviors;

(6.2.2) The ASN.1 definition of the syntax for GDMO objects described in the published standard ISO8824;

(6.2.3) Generic Operations Interfaces Using OSI Tools: Network Data Collection (a Module of OTGR, FR-439), Bellcore Customer Service, 8 Corporate Place, Room 3A-184, Piscataway, N.J. 08854; and (6.2.4) Generic Operations Interfaces Using OSI Tools: Network Traffic Management (a Module of OTGR, FR-439), Bellcore Customer Service, 8 Corporate Place, Room 3A-184, Piscataway, N.J. 08854.

Referring now to the object translator/manager 200, it includes a protocol detector 208 for interfacing with the data channels connected to the object translator/manager 200 (e.g., data channels 212a, 212b, 212c and 216). The protocol detector 208 detects messages on the data channels, determines the type of protocol being used to communicate messages on the data channels, and decodes data channel messages in the sense that it determines the object(s) to which each message applies. Additionally, the protocol detector 208 communicates each decoded message to an object model 220a in the form of data packets designating at least an object type (e.g., its class) and one or more attribute values of the object. The object model 220a maintains a run time object oriented model of the network based on the standards of (6.2.1) and (6.2.2) above. Thus, the object model 220a:

(7.1) provides the definitions for network objects;

(7.2) uses messages received from the protocol detector 208 to update values of object attributes and/or activate particular message specified object methods which may, in turn, update objects in the MIB 204; and/or (7.3) creates additional messages to output on the message data channels.

Note that, in general, such messages have a standard format. Further, a series of messages will typically be transmitted, via the object translator/manager 200, between two operational components that are in communication. In particular, such a series of message exchanges between first and second operational components are similar to the following pattern (excluding any intervening activities of the object translator/manager 200):

(8.1) the first operational component sends a "start communication" message to the second operational component;

(8.2) the second operational component sends a "message received" message to the first operational component;

(8.3) the first operational component sends a "request for (particular) data" message or an "execute command" message to the second operational component;

(8.4) if a request for data message is received, the second operational component sends one or more "requested data" messages to the first operational component having requested the data;

(8.5) alternatively, if the second operational component receives an execute command message, then the second operational component sends a "command executed" message to the first operational component once the command has been performed;

(8.6) the first operational component sends a "terminate communication" message to the second operational component; and (8.7) the second operational component sends a "message received" message to the first operational component.

Further, since the server (i.e., object translator/manager 200 and MIB 204) controls data communications between operational components, prior to data being supplied to an operational component, the operational component is now required to request the data from the server thereby specifying the data objects the operational component wishes to obtain.

As an example, the switch message data channels 212a and the data channels 216 provide data (and/or command) communication between the circuit switches 44b (which may include both circuit switches 44a as shown in FIG. 1 and/or newer standardized circuit switches) and one or more OSSs 224 having standardized object oriented interfaces. However, the data (and/or commands) is now also supplied to the object translator/manager 200. The protocol detector 208, in fact, intercepts all messages received by the object translator/manager 200 and sends object update messages when appropriate (e.g., steps (8.3) and/or (8.4)) to the object model 220a. If one such message is, for instance, a generic (object oriented) command message from an OSS 224 to a particular circuit switch instructing this switch to reconfigure or change its behavior, the protocol detector 208 provides information corresponding to the generic message to the object model 220a thereby allowing the object model to update the persistent switch object in the MIB 204 that is modeling the behavior of this switch so that the switch object maintains an accurate configuration of the switch. Subsequently, a method for the switch object is performed that generates a new message to be supplied to the switch, wherein the new message corresponds to the semantics of the generic command message but has a syntax or structure that is specific to the particular switch to which the new message is directed. Note that typically such object updates and message generation will require the object model 220a to retrieve the object (or its data) from the MIB 204. Further note that, preferably, the previous state or configuration of the switch (object) is still retained within the MIB 204 as a history or log of switch configurations.

Note that steps similar to the message transfer steps (8.1)–(8.7) may be performed regardless of the operational components designated as the first and second operational components. Therefore, steps (8.1)–(8.7) also apply, for example, when there are communications between the OSSs 224 and: (a) the SS7 network elements 100b (which may include both SS7 network elements 100a shown in FIG. 1 and/or newer standardized SS7 network elements), or (b) the transfer network elements 80b (which may include both transport network elements 80a and/or newer standardized transport network elements).

It is also worthwhile to mention that the architecture of FIG. 2 may offer significant advantages to large network service providers such as telephony service providers. Among these advantages are the following.

(9.1) Since the architecture of FIG. 2 is more data centralized, it facilitates the network-wide use of standardized network object class definitions that have been proposed in recent years. In particular, various standardized management information bases (MIBs) 228, shown as residing in the MIB 204, may be used. Preferably the MIBs 228 are based on national and/or international recognized standard class definitions for telephony network providers as, for example, cited in (6.2.3) and (6.2.4) above; and (9.2) The architecture of FIG. 2 facilitates enforcement of the use of standardized data objects throughout network management processing. The enforcement of this uniformity is likely to lead to less complex and more understandable network management systems in that, for example, (9.2.1) there are likely to be fewer data structures which network management personnel need to understand; and (9.2.2) the standardization of object class definitions for various aspects of network management provide a commonality between OSSs that heretofore has not been attained. Thus, not only can more coordinated activities between OSSs be realized (i.e., diagnosing or remedying network faults), but also network personnel having expertise at one OSS may be more easily utilized at other OSSs due to an overlap in common objects being processed at two different OSSs.

Figure 3A:
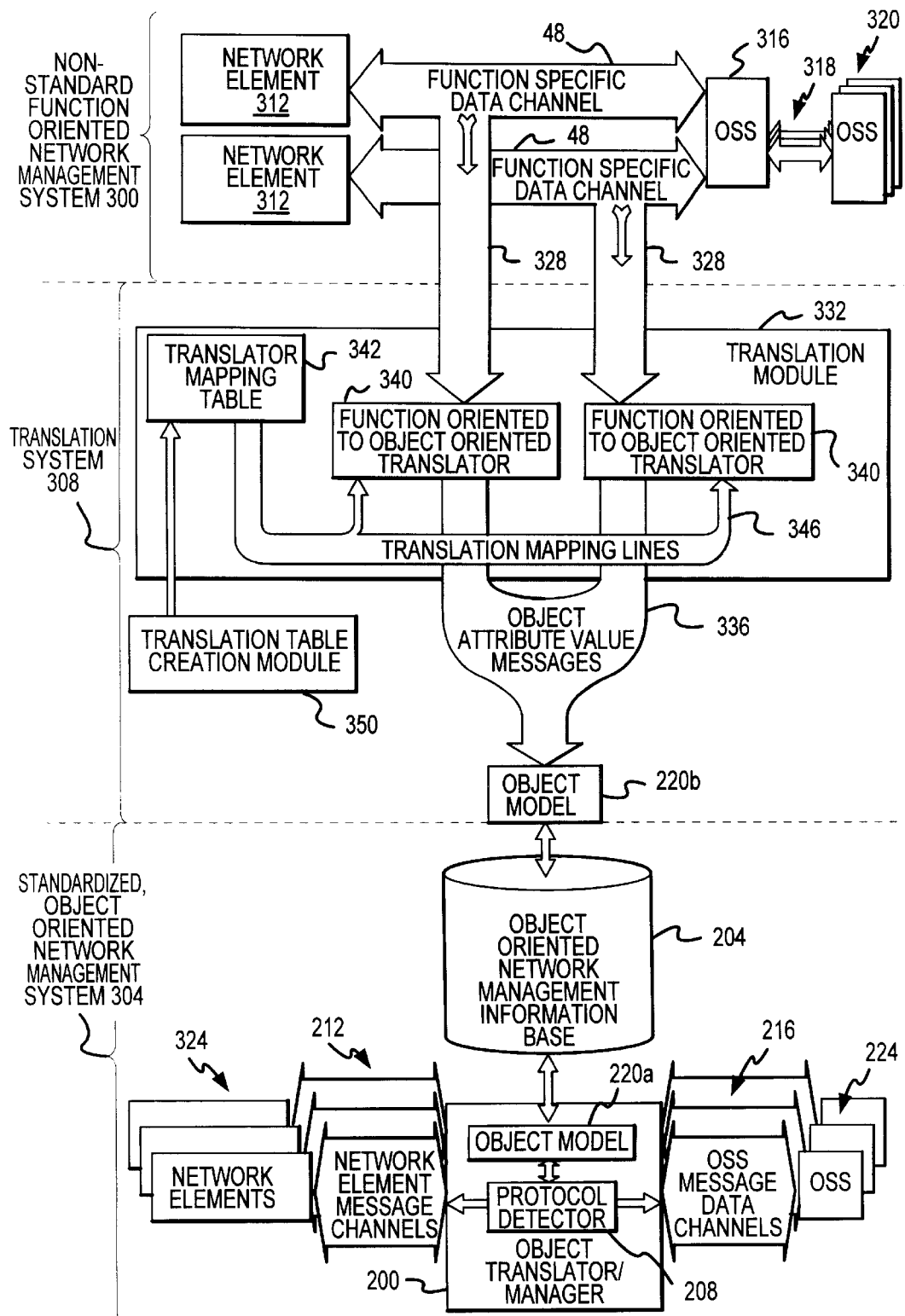
FIGS. 3A through 3E are high level diagrams illustrating various network configurations obtained in transforming a network as in FIG. 1 to a network as in FIG. 2 according to the present invention.
Figure 3B:
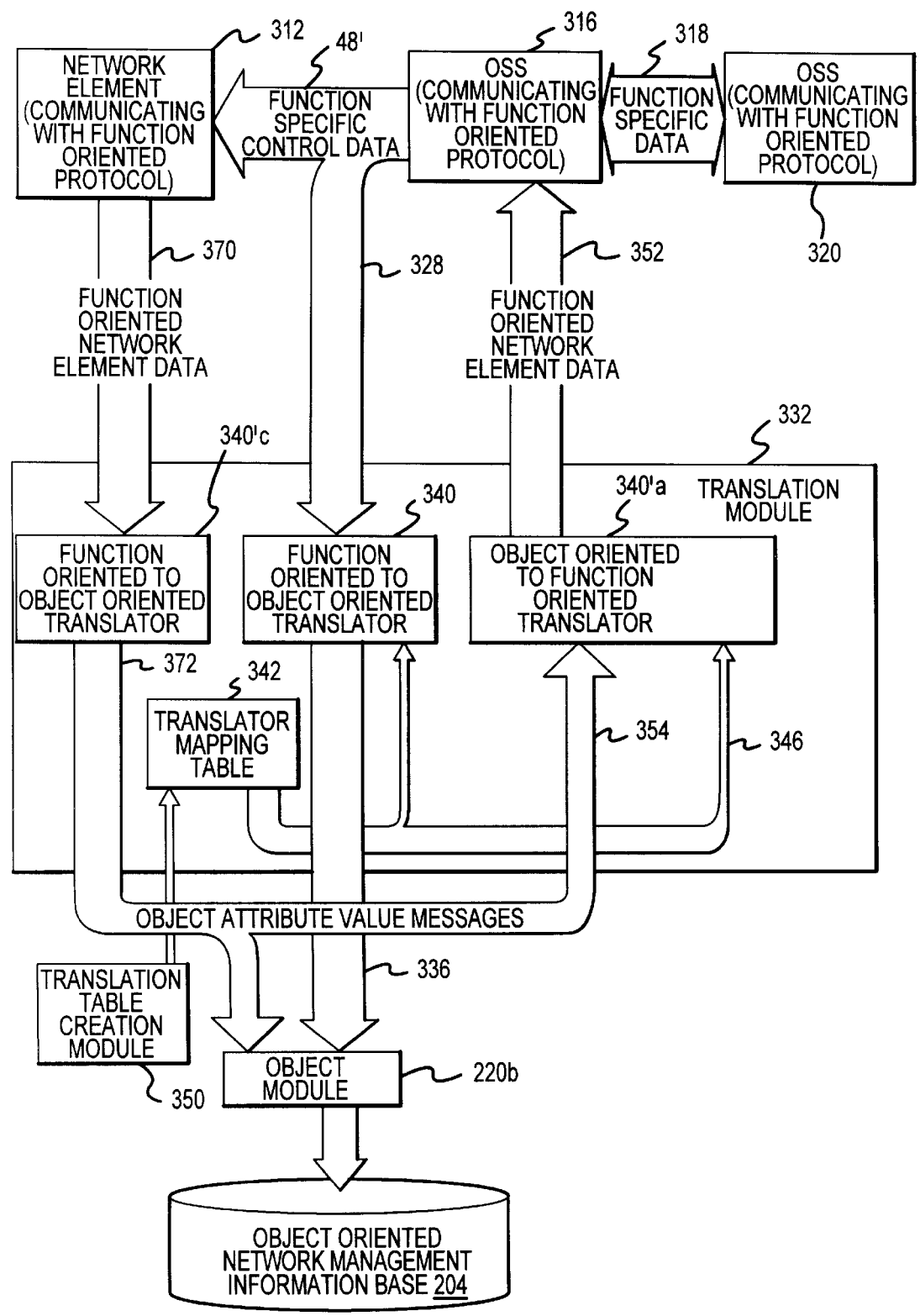
Figure 3C:
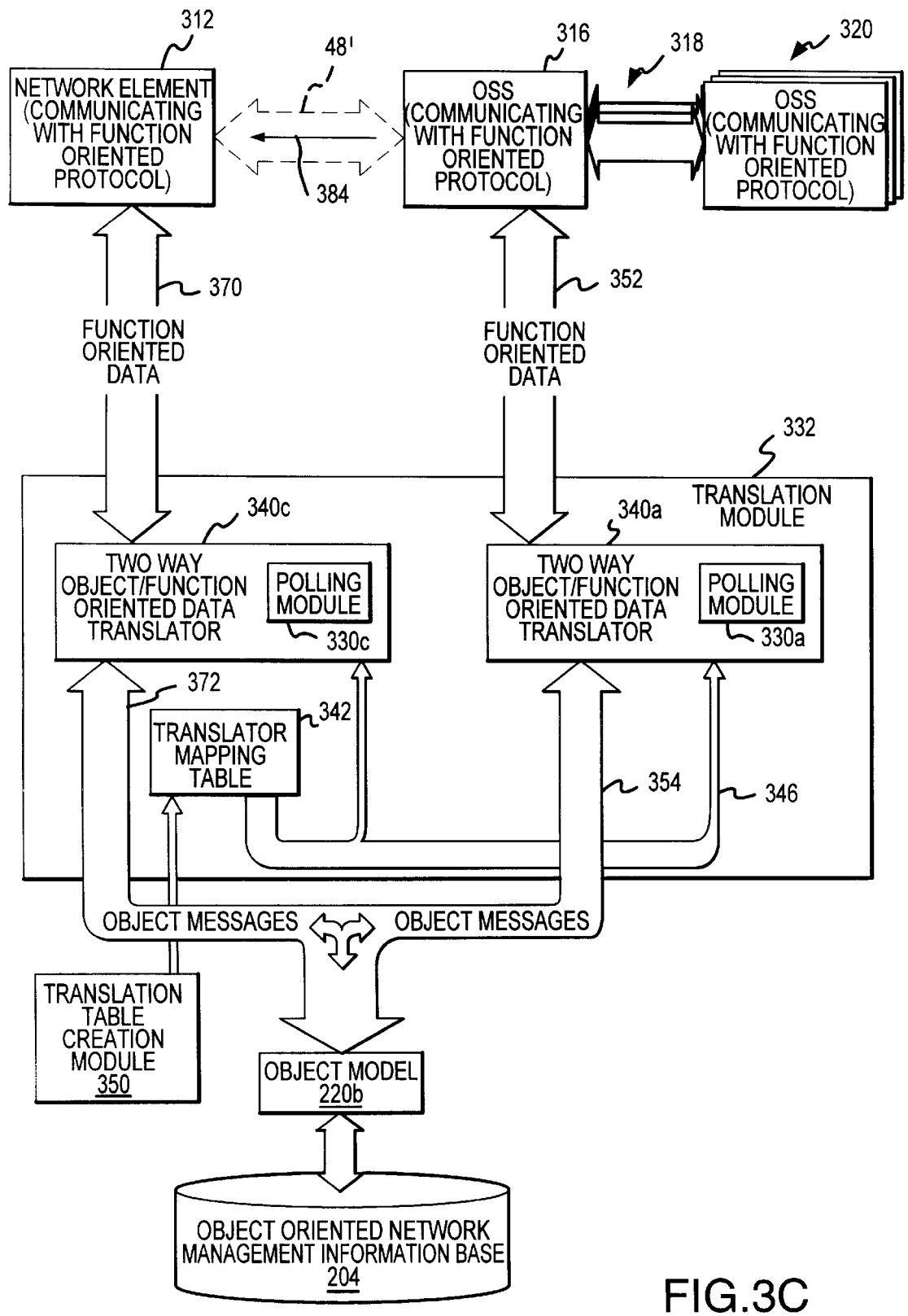
Figure 3D:
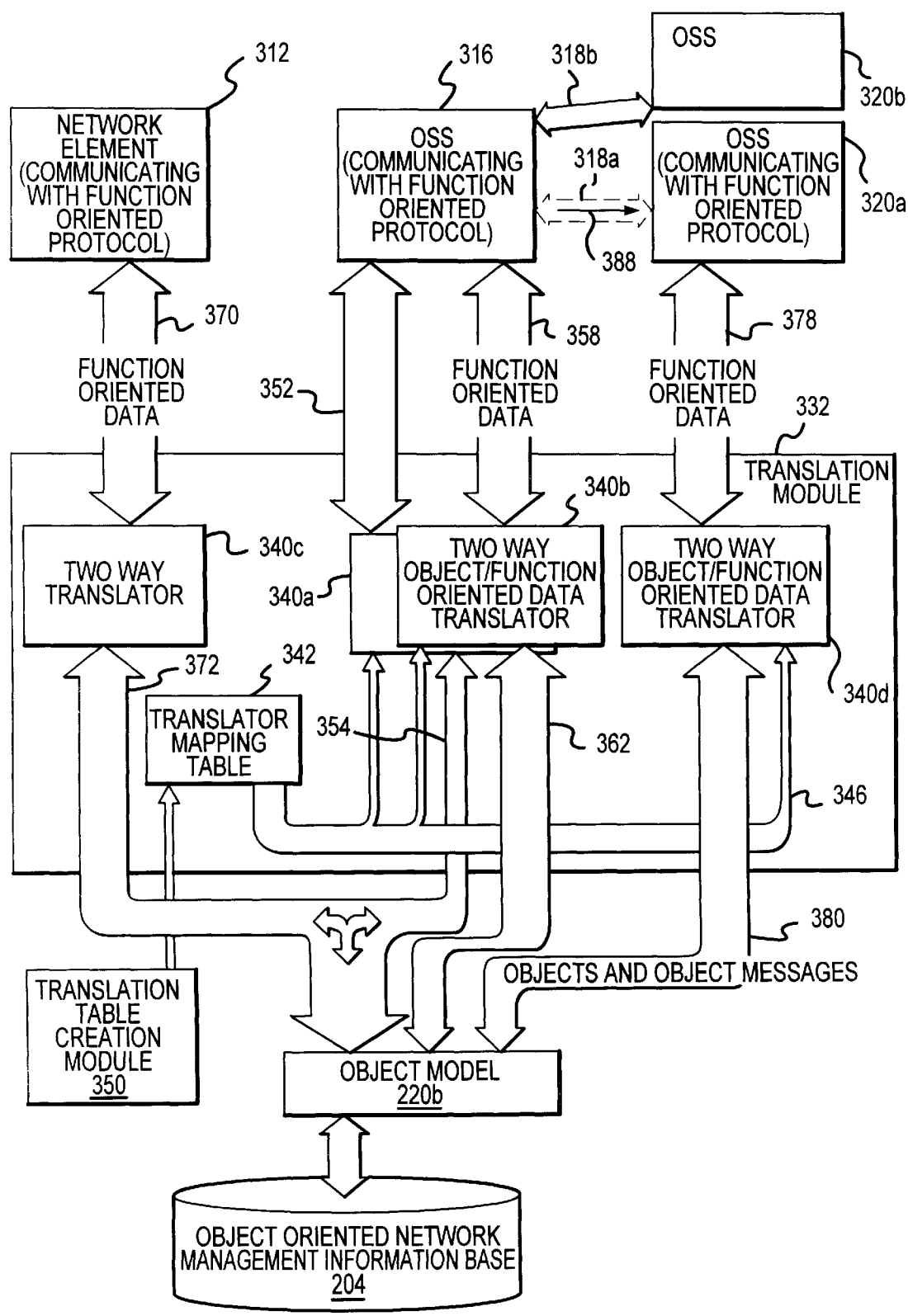
Figure 3E:
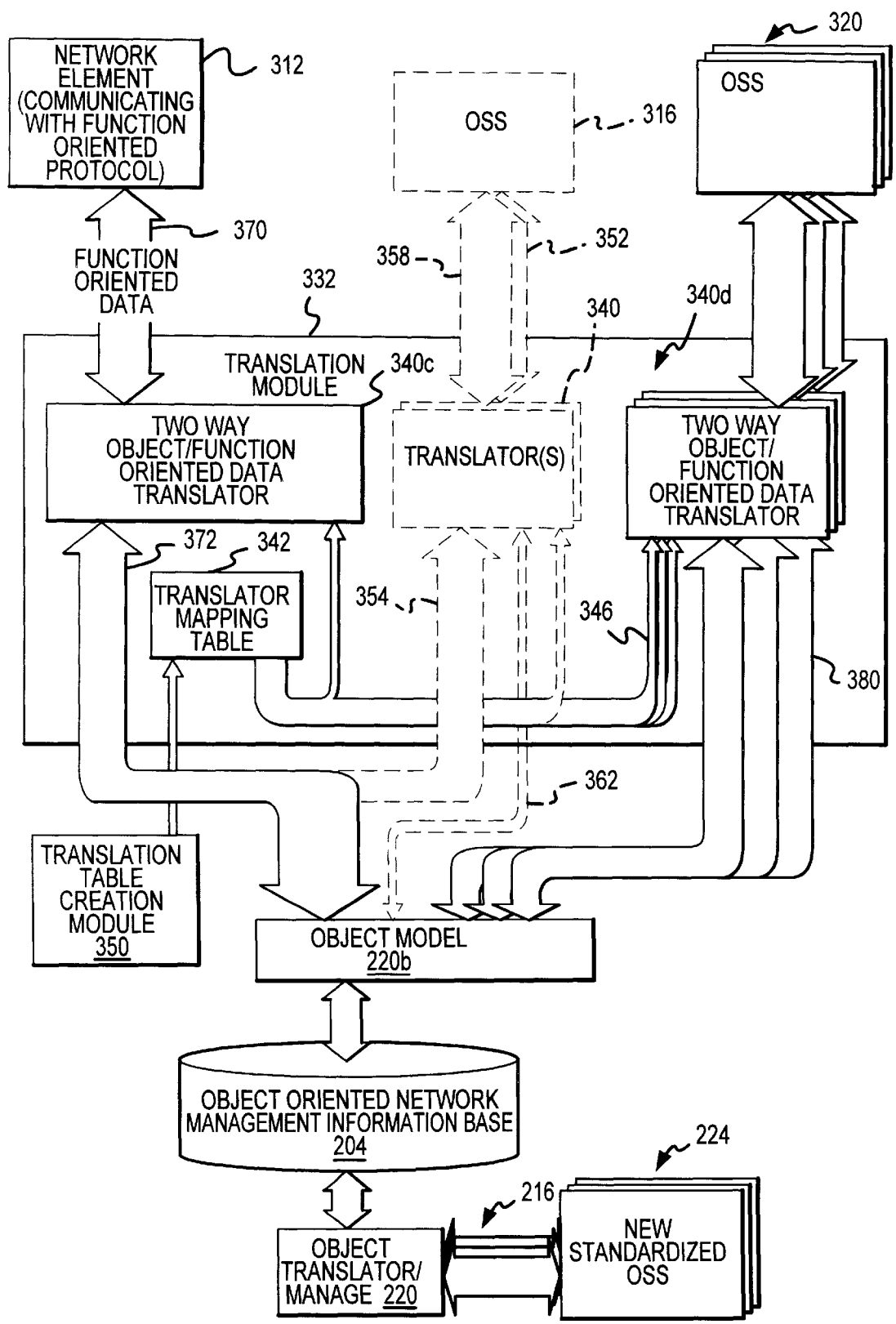
Figure 4A:
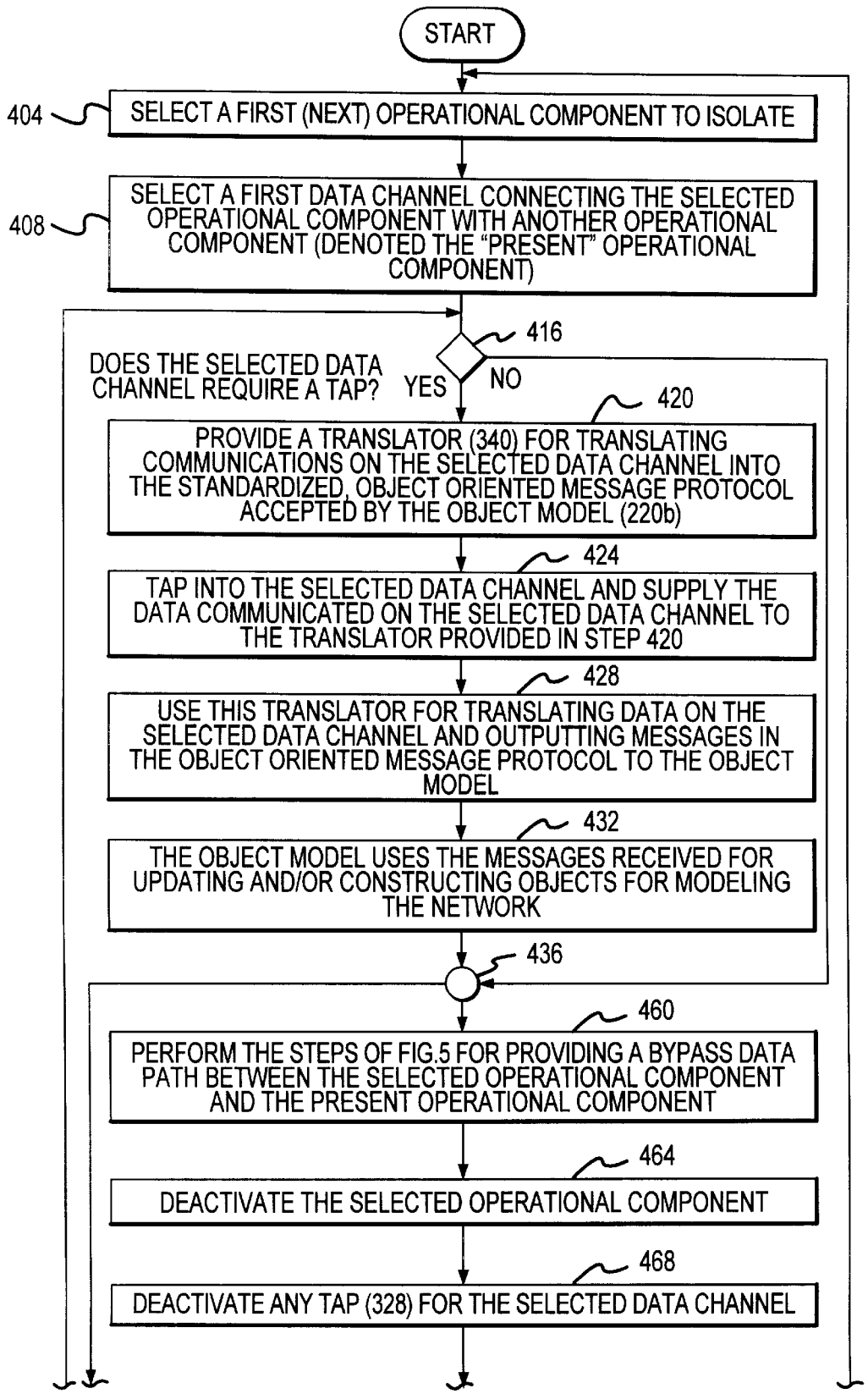
FIGS. 4A and 4B provide the high level flowchart of the steps of the present invention.
Figure 4B:
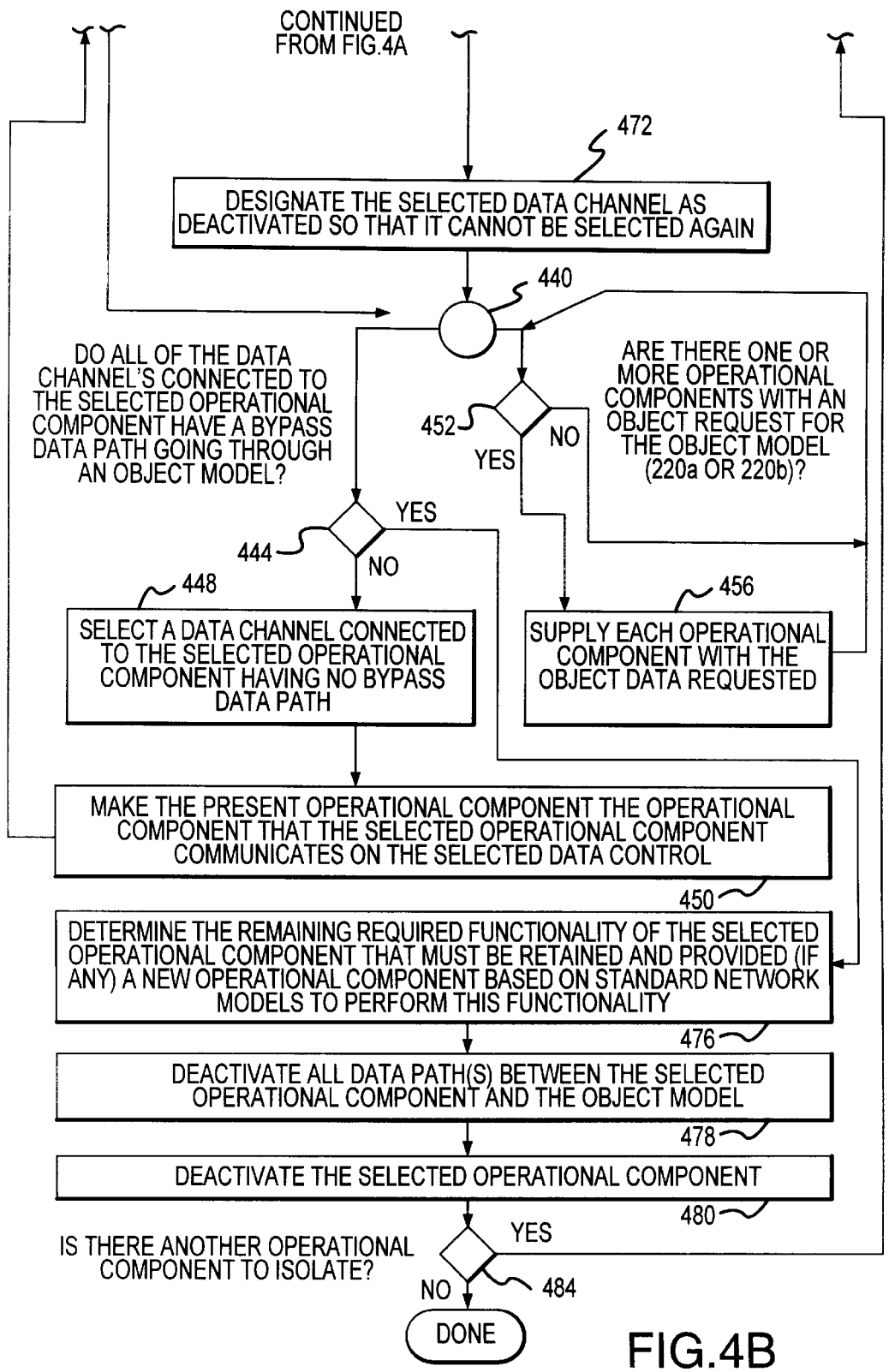
Figure 5A:
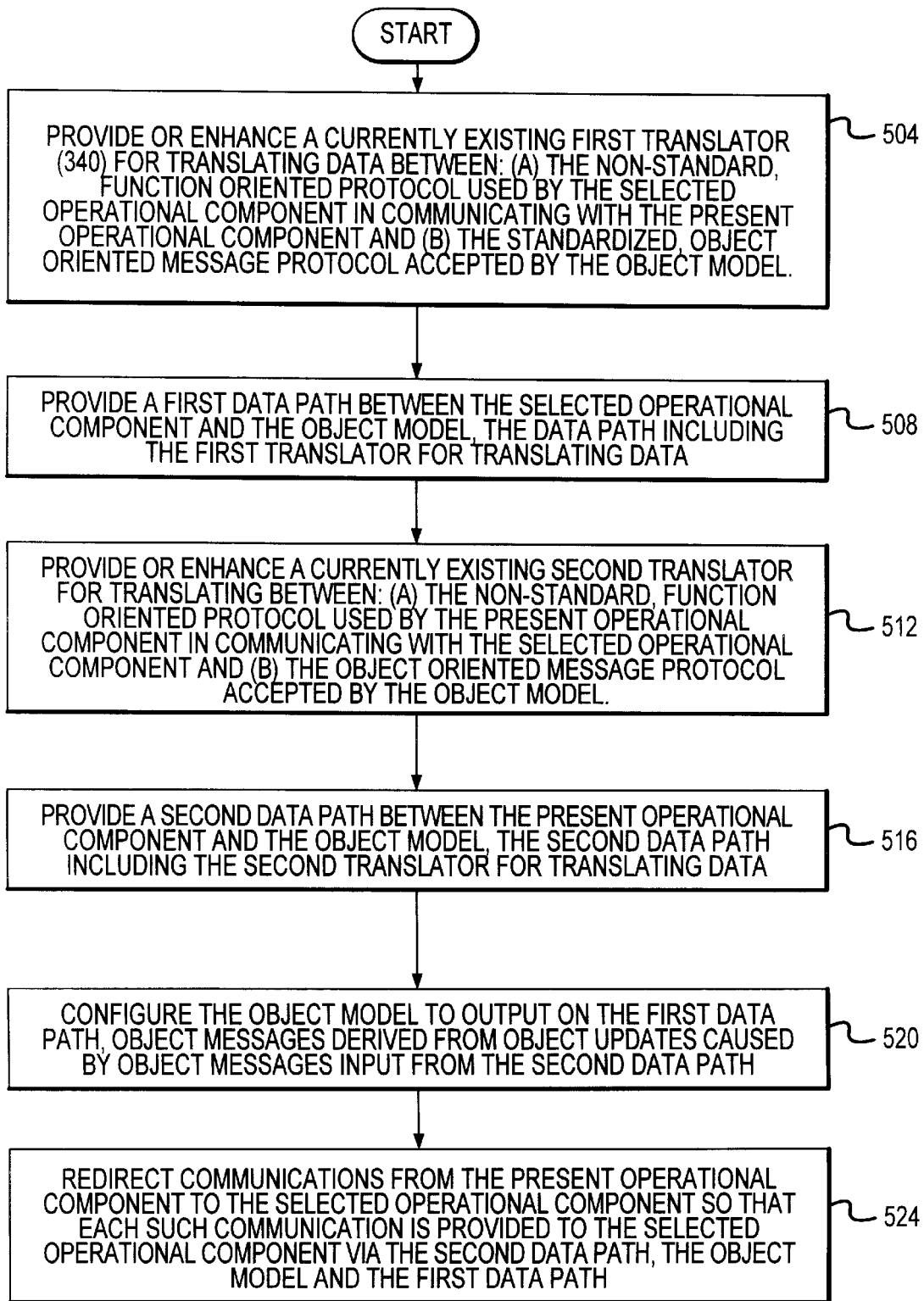
FIGS. 5A and 5B provide a more detailed flowchart presenting the steps for providing bypass data paths for nonstandard, function oriented data channels to be deactivated.
Figure 5B:
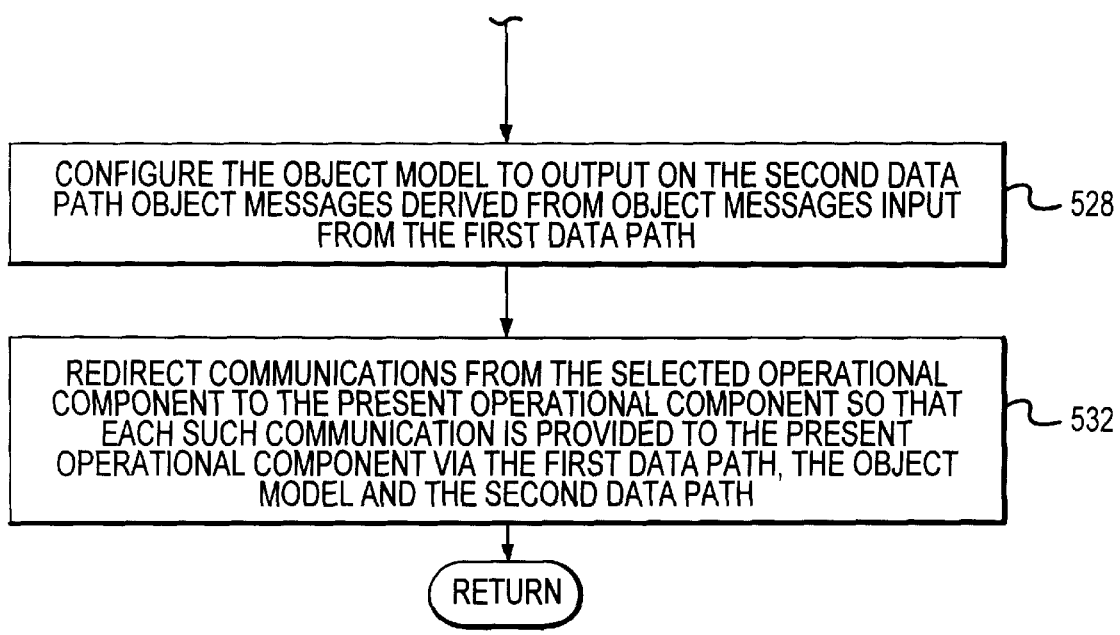

The flowcharts of FIGS. 4 and 5 present an embodiment of the present invention for transforming a network such as FIG. 1 into a network such as FIG. 2. FIGS. 3A through 3E illustrate various network configurations that correspond to performing particular steps in FIGS. 4 and 5. Thus, FIGS. 4 and 5 will be discussed in the context of the network configurations of FIGS. 3A–3E. Further, FIG. 3A will be discussed first so that a more concise context may be provided for the flowcharts of FIGS. 4 and 5.

In FIG. 3A an initial transition network architecture is shown for the method of the present invention. In particular, the network architecture of FIG. 3A shows the modules which, in the present embodiment of the invention, are needed for incorporating network elements and OSSs communicating using a nonstandard, function oriented architecture as in FIG. 1 into a standardized, open, object oriented network architecture as in FIG. 2.

At a high level, FIG. 3A includes three subsystems: a nonstandard, function oriented network management system 300, a standardized, object oriented network management system 304 and a translation system 308. The network management system 300 represents a network having an architecture as in FIG. 1. Thus, network elements 312 may represent, for instance, any two of the network elements of FIG. 1 (i.e., circuit switches 44a, transport network elements 80a and/or SS7 network elements 100a). The OSS 316 may represent any of the OSSs (of FIG. 1) directly communicating (via a data channel 48a, b or c) with a network element 312. Further, the OSS 320 may represent one of the downstream OSSs of FIG. 1 in communication with an OSS 316 (via data channel 318) that is, in turn, directly communicating with a network element.

The standardized object oriented network management system 304 represents a network having an architecture as in FIG. 2. Thus, network elements 324 may represent, for instance, any of the network elements of FIG. 2 (i.e., circuit switches 44b, transport network elements 80b and/or SS7 network elements 100b). It is important to note that at least the object translator/manager 200 and (some portion of) the MIB 204 together with their data connections are necessary to the method of the present invention. On the other hand, the other components and associated data channels of the network management system 304 are optional and may be introduced incrementally as needed. More precisely, regarding the MIB 204, the following features are required: (a) a data base management system which may be preferably either objected oriented or relational; and (b) an initial portion of the data base data schema definitions (i.e., table definitions and indexes in relational terms, and object class schema definitions in object oriented terms) sufficient to effectively store data relating to the communications between operational components of the network management system 304.

The translation system 308 translates between the network management system 300 and the network management system 304. In FIG. 3A, the translation done by this system is one way, from the network management system 300 to the network management system 304. More precisely, FIG. 3A shows a network configuration wherein for a selected OSS 316 and at least one network element 312 (in this case two), a data channel 48 is tapped so that data communicated on the data channel 48 may be provided to the translation system 308. (FIG. 3A shows two such data channels 48 being tapped). The data being supplied by the data channels 48, via the data channel taps 328, is supplied to the translation module 332 of the translation system 308. The translation module 332 translates the data and outputs object attribute values as object messages on data channel 336. Note that the object messages output are compatible with the standards cited in (6.2.3) and (6.2.4) above. Further, the output object attribute values are shown as being supplied to a second copy of the object model 220a, herein referenced as the object model 220b. However, this second copy is substantially for convenience in describing the invention, there being no inherent necessity for such a second copy to enable the invention. Also, note that in the network configuration of FIG. 3A, the object model 220b has as a primary function the populating of MIB 204 with object data from network management system 300 so that any new object oriented OSSs 224 requesting access to objects derived from such object data may receive these objects.

Returning now to the translation module 332, this module includes one or more special purpose translators 340 (FIG. 3A shows two such translators) for translating data from the nonstandard network protocols of network management system 300 to the standardized object attribute values output on data channel 336. Note that at least in telephony networks, translation mapping specifications have been produced that map between the nonstandard communication on data channels 48 and the standards of (6.2.3) and (6.2.4) above. In particular, the following documents published by Bellcore are examples of particular mapping specifications which are herein incorporated by reference:

(10.1) SR-2802, Issue 2, October 1995, Mapping of Existing STP and SCP Interfaces into OSI/CMISE Generic Operations for Network Data Collection and Network Traffic Management.

(10.2) SR-3563, Issue 1, September 1995, Mapping of 5ESS Traffic Measurements into OSI/CMISE Generic Operations Interfaces for Network Data Collection. Author: B. K. Casey (10.3) SR-3564, Issue 1, July 1995, Mapping of 5ESS Traffic Measurements into OSI/CMISE Generic Operations Interfaces for Network Data Collection. Author: B. K. Casey (10.4) SR-3565, Issue 1, September 1995, Mapping of 5ESS Traffic Measurements and Controls into OSI/CMISE Generic Operations Interfaces for Network Traffic Management. Author: B. K. Casey (10.5) SR-3566, Issue 1, December 1995, Mapping of DMS-100 Traffic Measurements into OSI/CMISE Generic Operations Interfaces for Network Data Collection. Author: B. K. Casey (10.6) SR-3567, Issue 1, August 1995, Mapping of DMS-100 Traffic Measurements into OSI/CMISE Generic Operations Interfaces for Network Data Collection. Author: B. K. Casey (10.7) SR-2568, Issue 1, November 1995, Mapping of DMS-100 Traffic Measurements and Controls into OSI/CMISE Generic Operations Interfaces for Network Traffic Management. Author: B. K. Casey (10.8) SR-3569, Issue 1, October 1995, Mapping of 1AESS Traffic Measurements into OSI/CMISE Generic Operations Interfaces for Network Data Collection. Author: B. K. Casey (10.9) SR-3570, Issue 1, October 1995, Mapping of 1AESS Traffic Measurements into OSI/CMISE Generic Operations Interfaces for Network Data Collection. Author: M. Sarkar (10.10) SR-3571, Issue 1, October 1995, Mapping of 1AESS Traffic Measurements and Controls into OSI/

CMISE Generic Operations Interfaces for Network Traffic Management. Author: B. K. Casey (10.11) SR-3572, Issue 1, November 1995, Mapping of DMS-10 Traffic Measurements into OSI/CMISE Generic Operations Interfaces for Network Data Collection. Author: B. K. Casey (10.12) SR-3573, Issue 1, November 1995, Mapping of DMS-10 Traffic Measurements into OSI/CMISE Generic Operations Interfaces for Network Data Collection. Author: M. Sarkar (10.13) SR-3574, Issue 1, September 1995, Mapping of AXE-10 Traffic Measurements into OSI/CMISE Generic Operations Interfaces for Network Data Collection. Author: B. K. Casey (10.14) SR-3575, Issue 1, September 1995, Mapping of AXE Traffic Measurements into OSI/CMISE Generic Operations Interfaces for Network Data Collection. Author: M. Sarkar is a collection of such specifications for these translation mappings. Further, each of the special purpose translators 340 may be used to translate the data and network commands attained from any data channel 48 regardless of the communications and/or protocol on that channel. A preferable way to achieve this result is to use identical translators 340 wherein such translators are configurable. That is, each activation of such a translator may read a different "translation mapping" providing different specifications for performing a different translation. Note that such translation mappings are supplied to the translators 340 by a translator mapping table 342 via the translation mapping lines or channels 346, the translator mapping table 342 being a central repository for all the translation mappings that may be needed by the translators 340 in the present and subsequent steps of the present invention. Further note that the translation mappings are supplied to the translation mapping table 342 by a translation table creation module 350 which uses specifications such as the Bellcore specifications cited in (10.1)–(10.14) above to generate the translation mappings.

Thus, once the architecture of FIG. 3A is in place and the translators 340 have each been provided with the appropriate mappings, data flowing between the network elements 312 and the OSS 316 is (transparently to the network elements 312 and the OSS 316) conveyed to the translators 340 via the data channel taps 328. The translators 340 subsequently translate the data received from the channel taps 328 into object oriented data messages designating at least an object type (e.g., a class) and attribute values of the object to which the message is directed. These messages are output to the object model 220b which assigns the received object attribute values to the appropriate objects and, for each such updated object, stores in the MIB 204 at least sufficient object data to reconstruct the updated objects. Thus, object oriented OSSs 224 that request objects updated and/or newly created using the data obtained from one or more data channels 48 may then access the objects via the object translator/manager 200.

To provide a clearer understanding of the steps related to modifying a network for obtaining the configuration of FIG. 3A (as well as the configuration of FIG. 2), reference is made to FIG. 4. FIG. 4 provides a flow chart of high level steps describing the present invention assuming (at least necessary portions of) the translation system 308, the MIB 204 and the object translator/manager 200 are provided. In particular, FIG. 4 shows how the present invention may be embodied for isolating one or more operational components concurrently. Accordingly, steps 404 through 432 of FIG. 4 describe the modifications to a network such as FIG. 1 for achieving a configuration similar to that of FIG. 3A. That is, these steps illustrate how the present invention provides a tap 328 for one of the data channels 48. Thus, in steps 404 and 408 an operational component and a data channel are selected. In step 416 a determination is made as to whether the selected data channel should be tapped. An affirmative result from this step may be provided, for example, when (a) it is desirable to populate a data base (e.g., MIB 204), and/or (b) the protocol on the selected data channel is complex and/or unknown and therefore requires a tap for decoding purposes. Subsequently, assuming a tap is to be provided, such as one of the taps 328, the steps 420 through 432 are performed.

To simultaneously have taps on more than one data channel 48 (as in FIG. 3A) and/or concurrently proceed with additional re-engineering steps, the path flow split points 436 and 440 are provided as indications of certain concurrent paths that may be taken in performing the present invention. That is, such paths may be substantially performed in any order and/or in parallel. However, note that these two path flow split points are merely examples of various concurrencies that may be provided by one skilled in the art. In particular, to illustrate such concurrency in FIG. 4, assume that the upper data channel 48 of FIG. 3A has been tapped as shown in that figure and that it is desirable to tap the lower data channel 48 as shown. Thus, assuming the OSS 316 is the selected operational component (step 404) and that the upper data channel 48 is the selected data channel (step 408), then to provide the two simultaneous taps 328, the flow path 436 through 450 may be followed. Therefore, in step 448 the lower data channel 48 may be chosen as the selected data channel and, in step 450, the lower network element 312 can be chosen as the present operational component. Subsequently, in a further iteration of the steps 416 through 432, the second data channel tap 328 may be provided. Further, note that although not illustrated in FIG. 3A, flow split point 436 provides concurrently for further modifications related to the first tapped data channel 48 via steps 460 through 472 as will be described below.

It is also important to note that the steps of FIG. 4 may be applied to a network while the network continues to service users and, in fact, such services may be enhanced while the network is in use in a way that is consistent with the re-engineering effort. For example, referring again to FIG. 3A, an OSS 224, based on the re-engineered network architecture, may be provided for enhancing network services (e.g., providing new reports) wherein the OSS 224 provides requests to the object translator/manager 200 to receive objects whose data has been supplied to the MIB 204 from a tap 328. Thus, the OSS 224 may receive such objects on an ongoing basis, via the object translator/manager 200 and a data channel 216 according to the steps 452 and 456 of FIG. 4.

It is also important to note that FIG. 4 does not distinguish between types of operational components in the network. Thus, FIG. 4 is not limited to the sequence or type of operational components selected for isolation in step 404. Accordingly, although FIG. 3A illustrates the present invention commencing at an OSS 316 directly connected to a network element 312, the method of FIG. 4 may commence with, for example, downstream OSSs such as an OSS 320 instead, or, even with a network element 312 if it is desirable for such an element to be isolated.

Still referring to FIG. 4, the flow path having steps 460 through 472 provide the remainder of the network modifications for deactivating a selected data channel enroute to isolating the currently selected operational component. Further, using FIG. 3A as an initial configuration to which steps 460 through 472 may be applied, FIGS. 3B through 3D show various network configurations that may be obtained during the process of deactivating a data channel. Accordingly, in step 460, the steps of FIG. 5 are performed wherein an alternate or bypass data path between the selected operational component and the present operational component (as described in step 408) is provided for the communications on the selected data channel in a manner that is transparent to the selected and present operational components. Thus, referring briefly to FIG. 3C, if the selected and present operational components are 316 and 312, respectively, and data channel 48' is the selected data channel, then the bypass includes the data channels 352, 354, 370 and 372 as well as the translators 340a and 340c for transforming data and/or commands between: (a) the protocol utilized by the selected and present operational components, and (b) a protocol acceptable to an object model (such as object model 220b). Therefore, network conditions affected by communications on data channel 48' may now be affected by communications on the bypass. For example, any expansive or restrictive control communication supplied to the network element 312 by the OSS 316 may be supplied via the bypass. Further, note that communications between the selected and present operational components may be concurrently routed through the object model transparently to the selected and present operational components. Further detail regarding step 460 will be given below when discussing the steps of FIG. 5.

Subsequently, once the bypass data path has been provided, then in step 468, the selected data channel becomes unnecessary and may therefore be deactivated. Following this in step 468, any functionality associated exclusively with any tap of the selected data channel is deactivated. Finally, in step 472 the selected data channel is designated as deactivated so that it will not be selected again in step 408.

Thus, by repeatedly looping back to step 416 via steps 448 and 450, each original data channel for the selected operational component may be provided with a bypass data channel (via step 460). When all bypasses have been provided for the selected operational component, the affirmative branch from decision step 444 is taken and steps 476 through 480 are performed for isolating the selected operational component. Finally, in step 484, a determination is made as to whether there are further operational components to isolate, if so then step 404 is again performed for selecting a different operational component to isolate. Alternatively, if no other operational component is to be isolated then the network has been re-engineered according to the present invention.

Referring now to FIG. 5, a series of high level steps are provided for redirecting data and/or commands from a nonstandard data channel to a bypass data channel that may also provide the data and/or commands, in an appropriate form, to an object model such as the object model 220b. Thus, in step 504, a translator is provided that can translate between: (a) the nonstandard, function oriented protocol used by the selected operational component, and (b) the standardized object oriented message protocol accepted by the object model. In step 508, a first data path between the selected operational component and the object model is provided wherein the translator is included in the data path. By applying the descriptions of network components as per FIG. 3A to FIGS. 3B–3D, these additional network configurations illustrate steps 504 and 508. In particular, assuming OSS 316 is the selected operational component, examples of a first translator as in steps 504 and 508 are shown in FIGS. 3C and 3D. That is, in FIG. 3C, assuming network element 312 is the present operational component and data channel 48' is the selected data channel, the translator 340a is an example of the first translator provided in step 504 and the data path including: (a) the data channel 352, (b) the translator 340a and (c) the object oriented message channel 354 (between the translator 340a and the object model 220b) is an example of the first data path of step 508. Alternatively, in FIG. 3D, assuming OSS 320a is the present operational component and data channel 318a is the selected data channel, then translator 340b is an example of the translator of step 504 and the data path including: (a) the data channel 358, (b) the translator 340b and (c) the object oriented message channel 362 (between the translator 340b and the object model 220b) is an example of the first data path of step 508.

In step 512 of FIG. 5, a second translator is provided for translating between: (a) the nonstandard, function oriented protocol used by the present operational component when communicating with the selected operational component, and (b) the object oriented message protocol accepted by the object model. Subsequently, in step 516 a second data path is provided between the present operational component and the object model wherein the second data path includes the second translator. Using the same assumptions as above for FIGS. 3C and 3D, respectively, examples of the second translator and the second data path may also be obtained. Thus, in FIG. 3C, translator 340c is an example of the second translator and the data path including: (a) the data channel 370, (b) the translator 340c and the message channel 372 (communicating between the translator 340c and the object model 220b) is an example of the second data path. Alternatively, in FIG. 3D, the translator 340d is an example of the second translator of step 512 and the data path including: (a) the data channel 378, (b) the translator 340d, and (c) the object oriented message channel 380 is an example of the second data path.

In step 520 of FIG. 5, the object model is configured to output, on the first data path, object messages derived from object updates caused by the object messages input on the second data path. In step 524, communications from the present operational component to the selected operational component are redirected so that such communication is provided to the selected operational component by the bypass data path including: (a) the second data path, (b) the object model and (c) the first data path. Referring to FIGS. 3C and 3D again, steps 520 and 524 can also be illustrated. In particular, in FIG. 3C, the object model 220b is reconfigured so that communications from the network element 312 to the OSS 316 are transmitted via the bypass channel including: (a) the data channel 370, (b) the translator 340c, (c) the data channel 372, (d) the object model 220b, (e) the data channel 354, (f) the translator 340a and (g) the data channel 352. Thus, the data channel 48' need now only provide data in a single direction, i.e., in the direction of arrow 384. Referring now to FIG. 3D, the bypass data path communicates data from the OSS 320a to the OSS 316 via, the bypass channel including: (a) the data channel 378, (b) the translator 340d, (c) the data channel 380, (d) the object model 220b, (e) data channel 362, (f) the translator 340b and (g) the data channel 358. Thus, function oriented data channel 318a is now only required to transfer data in the direction of arrow 388, since communications in the reverse direction may be provided via the bypass data path.

Subsequently, in steps 528 and 532, the object model is configured to also accept data in the reverse direction on the bypass data path and communications from the selected operational component to the present operational component are subsequently also transmitted on the bypass data path. Thus, referring again to FIGS. 3C and 3D, note that data channels 48' and 318*a*, respectively, are superfluous and may therefore be deactivated as is provided in the step 464 of FIG. 4.

As an aside, note that various rearrangements of the steps of FIG. 5 may be appropriate due to, for example, the specifics of a particular network. Thus, for instance, steps 520 and 524 may be exchanged with steps 528 and 532.

Although it is not stipulated as to how a particular operational component is selected to be isolated in FIGS. 4 and 5, in at least one embodiment of the present invention it is a preferred strategy that the OSSs such as those of FIG. 1 and/or network management system 300 of FIG. 3A be isolated by isolating first those OSSs that are most directly connected to a network element. Thus, FIGS. 3A through 3E provide a series of intermediate configurations for portions of a network being re-engineered according to this strategy. In particular, FIG. 3A shows a selected operational component (OSS 316) that is connected directly to a network element wherein a tap into a data channel 48' between the selected operational component and a network element has been performed. Following this, in FIG. 3B, a network configuration is shown that may be attained once step 524 of FIG. 5 is performed. That is, there is one way communication on the bypass data path from the present operational component to the selected operational component. Thus, the translators 340'*a* and 340'*c* need only have sufficient functionality to translate in one direction. That is, translator 340'*c* translates communications from a nonstandard, function oriented protocol into a standardized, object oriented message protocol while translator 340'*a* translates in the opposite direction. Subsequently, by the completion of the steps of FIG. 5, the configuration of FIG. 3C is provided wherein data channel 48' is now redundant. That is, all communications between network element 312 and OSS 316 use the bypass data path. Note that for many network elements that may be represented by network element 312, the OSS 316 is required to poll the network element 312 in order to receive network management information from the network element. Thus, for each such network element, the translators 340*a* and 340*c* include polling modules 330*a* and 330*c*, respectively, wherein when OSS 316 desires network management information from network element 312, OSS 316 polls translator 340*a*. Subsequently, the translator 340*a* uses the polling module 330*a* to poll translator 340*c* and subsequently the translator 340*c* uses the polling module 330*c* to poll the network element 312. Following this, the requested network management information flows in the reverse direction through the bypass data path from network element 312 to OSS 316.

Thus, assuming there are no further network elements attached to OSS 316, before commencing a next iteration of FIG. 4, steps 448 and 450 may be performed to set the selected data channel to a data channel 318 and set the present operational component to an attached OSS 320. Subsequently, by performing steps 416 through 460, the configuration of FIG. 3D may be attained wherein the selected data channel 318*a* is redundant. Similarly, by further iteration through the steps of FIGS. 4 and 5, any other data channels such as 318*b* that do not, as yet, have a corresponding bypass data path can also be made redundant and therefore deactivated. Consequently, when all data paths to the selected operational component, OSS 316, have a corresponding bypass data path, then (in step 476) a determination may be made as to whether there is any further functionality provided by the selected operational component that must be retained as part of the network management system. If so, then a new operational component may be provided that is based on standardized network models to perform this functionality. Note that the selected operational component is now redundant and the only data paths remaining connected to it are also connected to the object model. Therefore, these remaining data paths between the selected operational component and the object model may be deactivated as in step 478. At this point, the selected operational component is entirely isolated and may therefore be deactivated. Note that once the deactivation is accomplished, the network will have a configuration including the configuration of FIG. 3E wherein all dashed portions have been deactivated and the OSSs 320 that were communicating directly with the OSS 316 are now communicating via translators 340*d* with the object model 220*b* instead.

The foregoing discussion of the invention has been presented for purposes of illustration and description. Further, the description is not intended to limit the invention to the form disclosed herein. Consequently, variation and modification commensurate with the above teachings, within the skill and knowledge of the relevant art, are within the scope of the present invention. The embodiment described herein above is further intended to explain the best mode presently known of practicing the invention and to enable others skilled in the art to utilize the invention as such, or in other embodiments as well as with various modifications as required by a particular application or use of the invention. It is intended that the amended claims be construed to include alternative embodiments to the extent permitted by the prior art.

What is claimed is:

1. A method for re-engineering a telecommunications network having communicating operational components, comprising:

selecting first and second operational components of the telecommunications network and a first network information channel between said first and second operational components for communicating first network management information for managing said telecommunications network, wherein the first network information channel is communicated in a predetermined first protocol and wherein the first network management information is for transitioning said first operational component into a preferred state;

establishing a second network information channel between said first and second operational components, wherein:

(A1) on said second network information channel, said first and second operational components perform at least one of a sending and a receiving of network management information in said first protocol; and (A2) said second network information channel includes one or more translators for translating network management information between said first protocol and a different second protocol;

re-routing the first network management information, from the first network information channel to said second network information channel, wherein upon receiving said re-routed first network management information in said first protocol from one of said first and second operational components, one of said translators outputs second network management information in said second protocol;

utilizing the re-routed first network management information communicated between said first and second operational components, via said second network information channel, for transitioning said first operational component into said preferred state;

providing said second network management information to a network communication manager for said telecommunications network using said second network information channel; and repeatedly performing the above steps with: (a) a different operational component of said telecommunications network as an instance of said first operational component, (b) said same second operational component, and (c) said same network communication manager until each network information channel connecting an instance of said first operational component to said same second operational component is one of an instance of said first network information channel and an instance of said second network information channel.

2. A method as claimed in claim 1, wherein said step of selecting includes picking a network element as said first operational component and an operational support system that is in direct communication with said network element as said second operational component.

3. A method as claimed in claim 1, wherein said first protocol is a nonstandardized protocol.

4. A method as claimed in claim 1, wherein said preferred state includes one of a rerouting of user services and a restricting of user services.

5. A method as claimed in claim 1, wherein said second protocol is a protocol for transmitting object oriented messages.

6. A method as claimed in claim 1, wherein said network communication manager controls communication between at least two operational components of said telecommunications network.

7. A method as claimed in claim 1 further including a step of:

providing a third operational component of said telecommunications network for communicating third network management information to an instance of said first operational component, said instance hereinafter denoted said present operational component, wherein:
(A1) said third network management information is also supplied to said network communication manager;
(A2) said third network management information transitions said present operational component into its said preferred state.

8. A method as claimed in claim 1 further including a step of deactivating each instance of said first data channel.

9. A method as claimed in claim 1 further including a step of deactivating said second operational component when substantially every desired function of said second operational component is provided by another operational component of said telecommunications network.

10. A method as claimed in claim 9 further including a step of iterating all other steps with a different said second operational component for each iteration until said step of selecting cannot be further performed.

* * * * *